F. C. BARNES.
SEAM DAMPENER.
APPLICATION FILED JUNE 19, 1913.

1,134,434.

Patented Apr. 6, 1915.

4 SHEETS—SHEET 1.

WITNESSES:

INVENTOR.
F. C. Barnes
BY
Howard P. Denison
ATTORNEY.

F. C. BARNES.
SEAM DAMPENER.
APPLICATION FILED JUNE 19, 1913.
1,134,434.
Patented Apr. 6, 1915.
4 SHEETS—SHEET 2.
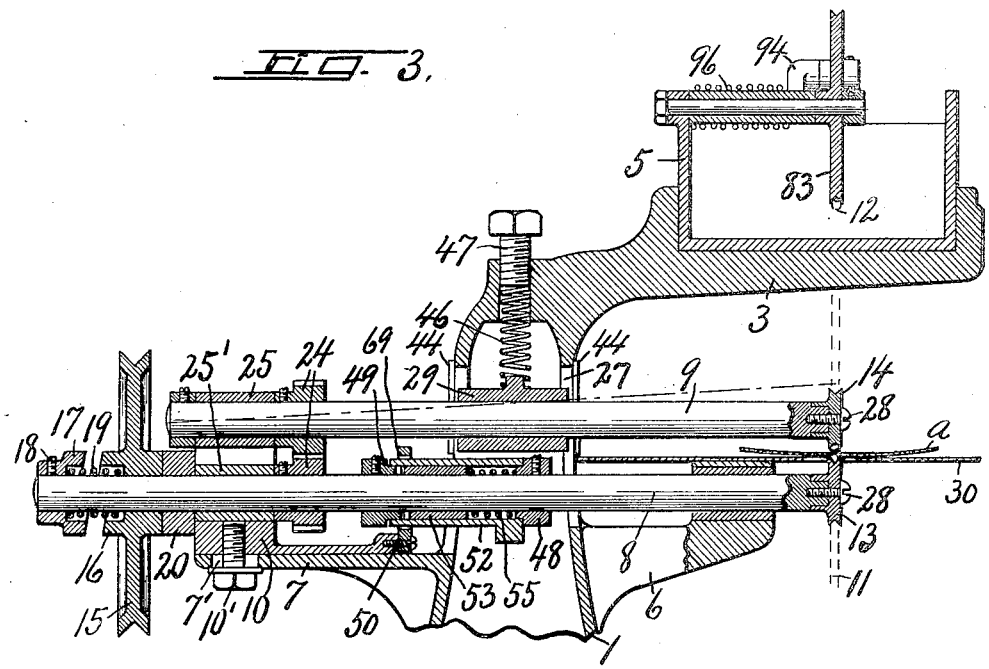
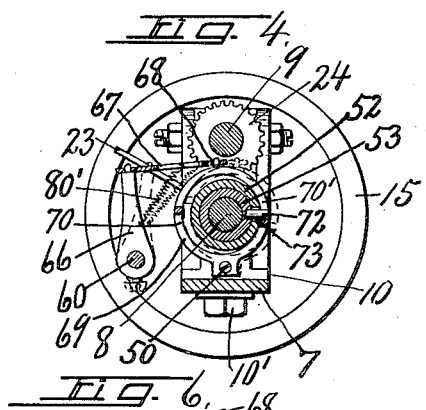
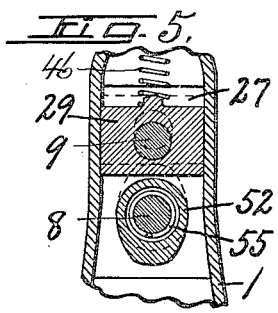
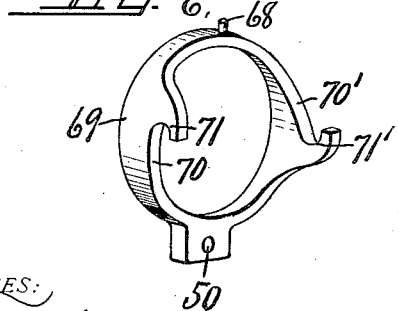
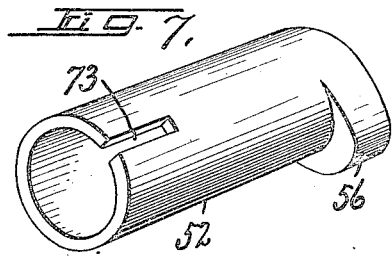
WITNESSES:
INVENTOR
F. C. Barnes
BY
Howard P. Denison
ATTORNEY.

F. C. BARNES.
SEAM DAMPENER.
APPLICATION FILED JUNE 19, 1913.
1,134,434.
Patented Apr. 6, 1915.
4 SHEETS—SHEET 3.
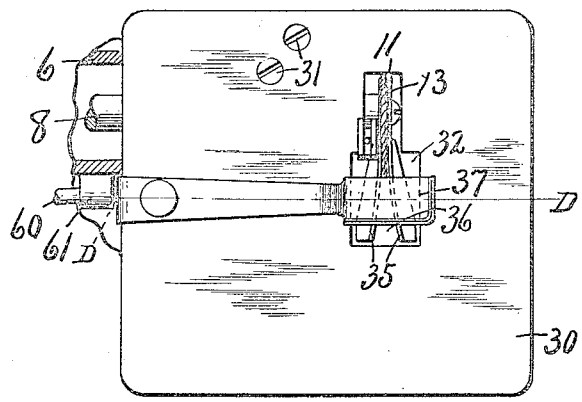
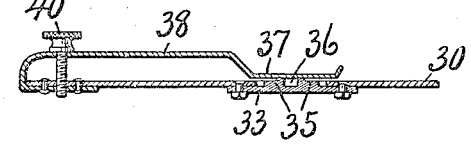
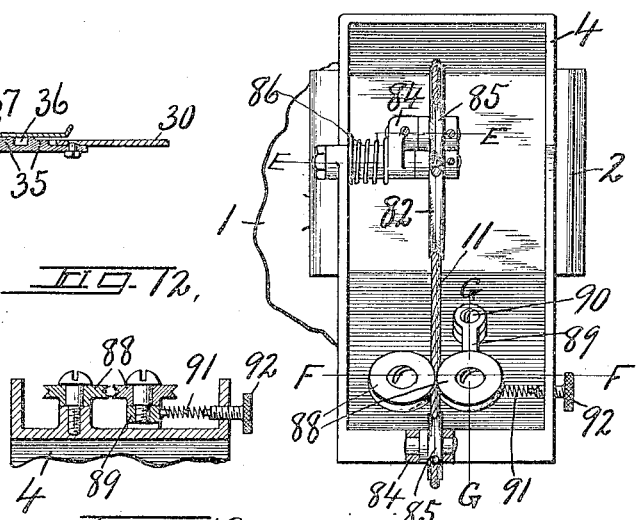
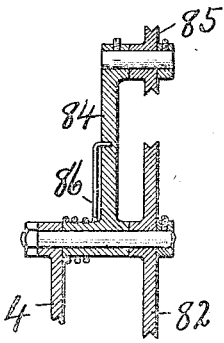
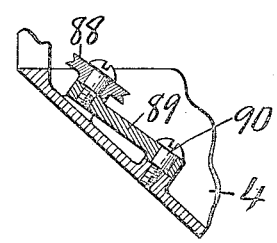
WITNESSES:
INVENTOR.
F. C. Barnes
BY
Howard P. Denison
ATTORNEY.

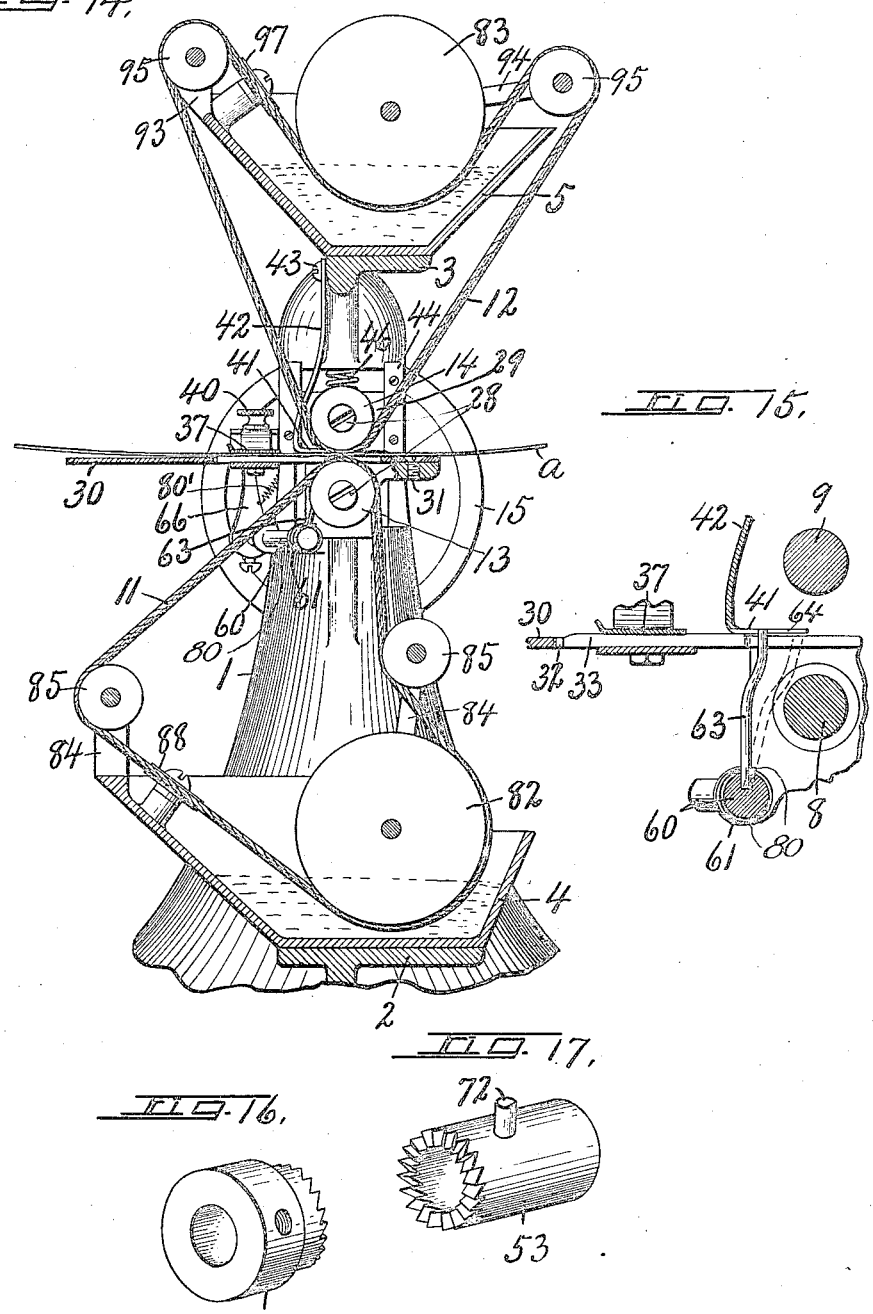

UNITED STATES PATENT OFFICE.

FRANK C. BARNES, OF HADDON HEIGHTS, NEW JERSEY, ASSIGNOR TO NATIONAL CHEMICAL COMPANY, OF SYRACUSE, NEW YORK, A CORPORATION OF NEW YORK.

SEAM-DAMPENER.

1,134,434.   Specification of Letters Patent.   Patented Apr. 6, 1915.

Application filed June 19, 1913. Serial No. 774,626.

*To all whom it may concern:*

Be it known that I, FRANK C. BARNES, of Haddon Heights, in the county of Camden in the State of New Jersey, have invented new and useful Improvements in Seam-Dampeners, of which the following, taken in connection with the accompanying drawings, is a full, clear, and exact description.

This invention relates to certain improvements in seam dampening machines for moistening flat turn-down collars along the line of the fold to facilitate folding along such moistened line preparatory to ironing or smoothing the folded edge.

The main object is to provide simple means for automatically and simultaneously feeding, guiding and moistening collars in rapid succession along the lines of their folds and on both sides thereof so that the collar may be easily folded without liability of over-straining or breaking the threads of the fabric.

Another object is to provide means operated by the collar for controlling the engagement of the moistening and feeding device therewith.

A further object is to enable the dampening device to be adjusted relatively to the collar guide so as to effect the moistening of the collar at the proper distance from the seam uniting the back and front portions of said collar.

A still further object is to make the moistening cables of substantially equal length so that they may be easily and conveniently interchanged, removed or replaced at will.

Another object is to provide simple means for tensioning the cables upon their respective drums or idlers for the purpose of automatically taking up slack and facilitating their removal and replacement.

Other objects and uses relating to specific parts of the machine will be brought out in the following description.

Figure 1:
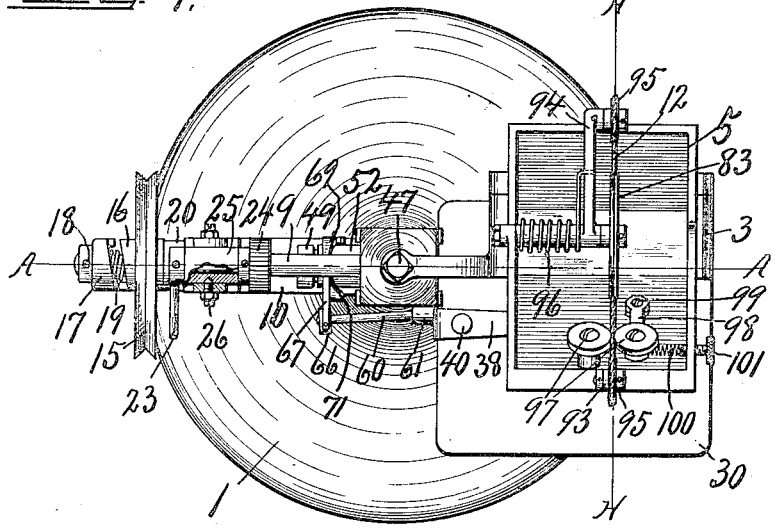
Figure 2:
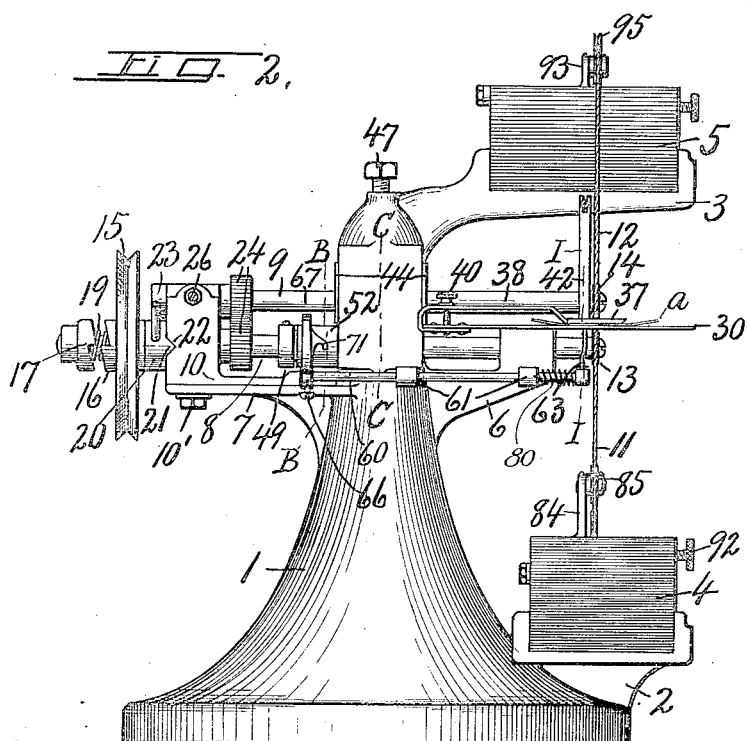

In the drawings—Figures 1 and 2 are respectively a top plan and a front elevation of a collar-dampening machine embodying the various features of this invention. Fig. 3 is an enlarged longitudinal vertical sectional view of the upper portion of the machine taken on line A—A, Fig. 1. Figs. 4 and 5 are enlarged transverse vertical sectional views of upper portions of the machine taken respectively on lines B—B and C—C, Fig. 2, except that the cam ring and its operating means, Fig. 4, are in their normal positions instead of active. Figs. 6 and 7 are perspective views of the cams for controlling the raising and lowering of the upper shaft which carries one of the moistening belts. Fig. 8 is an enlarged top plan of the feeding table showing the presser foot, collar guides and lower moistening belt. Fig. 9 is a longitudinal vertical sectional view through the feeding table and presser foot taken on line D—D, Fig. 8. Fig. 10 is an enlarged top plan of the lower reservoir and belt-supporting sheaves and idlers mounted thereon, together with a portion of the lower moistening belt. Figs. 11, 12 and 13 are detail sectional views taken respectively on lines E—E, F—F and G—G, Fig. 10. Fig. 14 is an enlarged transverse vertical sectional view through the lower and upper reservoirs and intervening portions of the machine taken on line H—H, Fig. 1. Fig. 15 is a transverse vertical sectional view through the feeding table and driving shafts for the moistening belts taken on line I—I, Fig. 2, showing more particularly the presser foot and tripping finger for the clutch-controlling cam by which the upper shaft is lowered and raised as the collar enters and leaves the machine. Figs. 16 and 17 are perspective views of the clutch sections between the cam sleeve and driving shaft.

This machine comprises a main supporting-frame or standard —1— having a suitable supporting base and laterally projecting arms or brackets —2— and —3— located at one and the same side of the machine near the bottom and top thereof for supporting suitable reservoirs —4— and —5—, the intermediate portion of the frame being also provided with opposite laterally projecting arms or brackets —6— and —7— for partially supporting a main driving shaft —8— and a superposed counter shaft —9—, the bracket —7— also serving to support a sliding plate —10— carrying one end of both of the shafts —8— and —9— so that both may be adjusted longitudinally for effecting a corresponding adjustment of the moistening belts as —11— and —12— which are passed around grooved wheels —13— and —14— on the ends of said shafts.

The main shaft —8— is provided with a grooved loose pulley —15— having a clutch section —16—, which, together with the pulley, is movable axially into and out of operative engagement with a corresponding clutch section —17—, the latter being secured to the adjacent end of the driving shaft —8— by a set screw —18—. These clutch sections are normally forced apart by an intervening coil spring —19— surrounding the shaft but are adapted to be brought into engagement with each other by axial shifting of the loose pulley —15— through the medium of a collar —20— which is loose on the shaft and is provided with a V-shape cam —21— coacting with a similar cam groove —22— on the adjacent end face of the sliding plate —10— as shown more clearly in Fig. 2, said collar being provided with a radial handle —23— by which it may be rocked upon the shaft to throw the cam —21— into and out of registration with the cam groove —22— for the purpose described.

The grooved pulley may be connected by a belt to any suitable source of power and is adapted to be driven continuously so that, when shifted axially from its normal position, as shown in Fig. 2, to bring its clutch section —16— into engagement with the corresponding clutch section —17—, similar rotary motion will be imparted to the driving shaft —8—. Similar rotary motion is transmitted to the counter shaft —9— by means of intermeshing spur gears —24— which are secured respectively to the driving shaft —8— and counter shaft —9— just inside of the inner face of the upwardly projecting part of the sliding plate —10—.

In order that the plate —10— may be adjusted longitudinally for effecting a corresponding adjustment of the shafts —8— and —9— and moistening belts —11— and —12— driven thereby, the bracket —7— is provided with a lengthwise slot —7'— for receiving a clamping screw —10'— engaged with said plate for rigidly holding it in its adjusted position.

The counter shaft —9— is movable or tiltable vertically to throw its belt-driving pulley —14— and adjacent portion of the belt toward and from the coacting lower pulley —13— into and out of operative engagement with the collar and for this purpose is journaled near one end in a tiltable bearing —25— which is pivoted at —26— to and between upstanding arms of the plate —10— as shown more clearly in Figs. 1 and 2, the shaft being held against endwise movement relatively to the driving shaft —8— by means of a collar and the hub of the corresponding pinion —24— which engage opposite ends of the bearing —25—. In like manner, the driving shaft —8— is held against endwise movement relatively to the counter shaft by means of the cam collar —20— and hub of the corresponding pinion —24— which engage opposite ends of an adjacent journal bearing —25'— for said shaft, the opposite end of the driving shaft —8— being journaled in a suitable bearing on the arm or bracket —6—.

The driving pulleys —13— and —14— for the belts —11— and —12— are detachably secured to the adjacent ends of their respective shafts by means of cap screws or bolts —28— as shown more clearly in Fig. 3 which permits said pulleys to be replaced by new ones when necessary or desirable without displacing the shafts.

A substantially flat feeding table —30— is secured by suitable fastening means, as screws —31—, to the upper face of the bracket —6— in a horizontal plane between the adjacent portions of the shafts —8— and —9— and is provided with an opening —32— therethrough for receiving the upper edge of the lower pulley —13— and permitting it to coact with the superposed pulley —14— so that the meeting faces of the belts —11— and —12— may engage and feed the collar across the surface of the table. These folding collars are usually provided with a seam uniting the front to the back portions and, when the collar is flat forms a lengthwise rib alined with the upper edge of the tabs of the collar which is folded just at one side of the seam. This rib is utilized in guiding the collar while it is being fed through the machine so as to moisten such collar along a line parallel with and in close proximity to the seam and for this purpose I have provided a guide plate —33— secured to the underside of the feeding table —30— by suitable fastening means as screws and provided with rearwardly extending raised ribs —35— projecting through the opening —32— and spaced a sufficient distance apart to form a groove —36— in which the seam of the collar as —a— is adapted to travel, the ribs —35— serving to engage opposite sides of the seam or rib of the collar to guide the same, in the manner described. Directly above and coacting with the guide ribs —35— is a presser foot —37— formed on one end of a spring arm —38— which is riveted or otherwise secured to one edge of the table as shown more clearly in Fig. 9 and is adjustable by means of a screw —40— for varying the degree of pressure of the foot —37— upon the collar as may be desired. The presser foot —37— is located directly over the guide ribs —35— some distance to the front of the meeting faces of the belt-driving rollers —13— and —14— but in the use of my improved automatic clutch-shifting device hereinafter described and which is adapted to be operated by the collar upon its entrance and fed between said rollers, it is desirable to use an additional presser foot —41— located between the presser foot —37— and feeding rollers just above the table and is mounted on the lower end of a spring arm —42— which is secured by suitable fastening means, as a screw —43—, to the upper arm —3— above the table.

*Collar gripping and releasing device.*—As previously stated, the upper shaft —9— is movable or tiltable vertically to a slight angle relatively to the shaft —8— and about the axis of the pivot —26— sufficient to separate the contiguous faces of the belts —11— and —12—, the object of which is to prevent accumulations of excessive moisture at the surface of the table when no collars are present between the belts as would be the case if the belts were allowed to travel in contact and for this purpose I have provided the shaft —9— with a vertically movable bearing —29— which is guided in vertically elongated openings or ways —27— in the upper portion of the standard —1— just above the plane of the table —30— but below the arm —3— and is held against endwise movement by plates —44—, the latter being secured to opposite sides of the adjacent portion of the standard preferably by screws as shown more clearly in Figs. 3 and 14. This bearing —29— and, therefore, the shaft —9— is spring-pressed downwardly by means of a coil spring —46— located in the interior of the upper portion of the standard —1— and having one end engaged with the upper side of the bearing —29— and its other end engaged with an adjusting screw —47— in the top of the standard for varying the tension of the spring and thereby varying the pressure with which the wheels or rollers —13— or rather the belts driven thereby are brought into engagement with each other. A pair of collars —48— and —49— are secured by set screws to the driving shaft —8— some distance apart for receiving between them a cam sleeve —52— which is of somewhat larger interior diameter than the exterior diameter of the shaft for receiving a sliding clutch collar —53—, the latter being movable axially within the sleeve into and out of engagement with a corresponding clutch face on the adjacent end of the collar —49— and is forced into engagement with said clutch face by means of a coil spring —55— having one end bearing against the collar —48— and its other end bearing against the adjacent end of the clutch sleeve —53— as shown more clearly in Fig. 3. The ends of this cam sleeve are preferably journaled upon reduced adjacent ends of the collars —48— and —49— which serve to hold the sleeve against endwise movement except as the shafts —8— and —9— are moved endwise in the manner previously described for adjusting the moistening belts relatively to the collar guide. One end of the sleeve lies directly under the central portion of the superposed bearing —29— for the shaft —9— and is provided with a cam or eccentric portion —56— adapted to engage and normally hold the bearing —29— and wheel-end of the shaft —9— in an elevated position when the machine is at rest or when there is no collar present between the meeting faces of the moistening belts. In order that the raising and lowering of this shaft may be controlled entirely by the collar, I have provided an auxiliary shaft or spindle —60— journaled in suitable bearings —61— on the bracket —6— and upright standard —1— some distance below the feeding table —30— and extending from a point near the plane of the moistening belts at one side of the standard to a point in proximity to the opposite end of the cam sleeve —52— as shown more clearly in Figs. 1 and 2, the end of this shaft —60— nearest the belts being provided with an upwardly projecting trigger finger —63— projecting through the opening —32— and slightly above the top of the table —30— and also into a lengthwise slot —64— in the superposed presser foot —41— and, therefore, in the path of movement of the advance end of the collar when inserted into the machine for moistening. The opposite end of this auxiliary shaft —60— is provided with an upwardly projecting crank arm —66— which is connected by a link —67— to a pin —68— on the periphery of a cam ring —69— as shown more clearly in Figs. 1, 2, 4 and 14. This cam ring —69— surrounds the adjacent end of the cam sleeve —52— and is of somewhat greater interior diameter than the exterior diameter of said sleeve to allow it to move radially or transversely of the shaft —9—, the lower end of said ring being pivoted at —50— to the adjacent end of the plate —10—.

One edge of the ring is provided with diametrically opposite but reversely arranged cam faces —70— and —70'— terminating in diametrically opposite but reversely arranged stops —71— and —71'— for coöperative engagement with a stud or pin —72— which projects radially from one side of the clutch sleeve —53— through an axially elongated slot —73— in the adjacent side of the cam sleeve —52— as shown more clearly in Figs. 4 and 7. The operation of this collar-controlled clutch mechanism is as follows: Assuming that the loose pulley —15— is operatively connected to the shaft —8— through the medium of the clutch —17— for rotating the shafts —8— and —9— and moistening belts carried by their respective pulleys —13— and —14— and that the cam sleeve —52— is in the position shown by dotted lines in Fig. 5 for holding the shaft —9— in its elevated position to separate its moistening belt from the lower belt —11—, then, as the operator inserts a collar endwise across the table between the presser foot —37— and guides —35— with the rib of the collar registering with the groove —36— and continues to force said collar by hand under the presser foot —41—, the advance end of said collar will encounter and rock the trigger —63— forwardly to the position shown by dotted lines in Fig. 15 until the upper end of said trigger finger passes below the surface of the table by which movement the auxiliary shaft —60— will have been rocked, thereby similarly rocking the crank arm —66— toward the shaft —8— to effect a radial shifting movement of the cam ring —69— through the medium of the link —67— sufficient to move the shoulder —71'— out of the path of movement of the outer end of the pin or stud —72—, it being understood that the stud had been previously engaged by the cam face —70'— for withdrawing the clutch sleeve —53— out of engagement with its companion clutch face —54— against the action of the spring —55—. After the clutch pin —72— has been released in the manner described, the spring —55— automatically forces the clutch sleeve —53— into engagement with the rotating clutch collar —49—, thereby rotating the clutch sleeve and its radially projecting stud or pin —72— around the adjacent face of the cam ring —69— until it engages the opposite cam face —70— and thereby withdraws the clutch sleeve —53— from interlocking engagement with its clutch collar —49—whereupon the pin engages the limiting stop —71— to prevent further rotation of the clutch collar. During this last action, the cam sleeve —52— is rotated substantially one-half revolution by reason of the fact that the pin —72— engages in the slot —73— and thereby keys the cam sleeve to the clutch sleeve. This half turn of the cam sleeve —52— causes the cam —56— to travel from the position shown by dotted lines to the position shown by full lines in Fig. 5, thus releasing the bearing —29— and its shaft —9— and allowing the spring —46— to press said shaft downwardly to bring its moistening belt into contact with the collar and, in view of the fact that both shafts and their belt-supporting rollers are driven at the same rate of speed, the moistening belts engaging the opposite faces of the collar will feed said collar through the machine, said collar serving to hold the trigger —63— in its operative position throughout its entire length. Now, as soon as the trailing end of the collar leaves the trigger —63—, the latter will be returned to its normal position by means of a retracting spring —80— which also returns the cam ring —69— to its normal position through the medium of the return movement of the crank arm —66— and link —67—, thereby releasing the stud or pin —72— from engagement with the stop shoulder —71— and allowing the spring —55— to again throw the clutch sleeve —53— into engagement with the clutch collar —49— for rotating the cam sleeve —52— through the entire half turn or to its normal position for causing its cam —56— to engage the bearing —29— and thereby restore the shaft —9— and its corresponding belt to their normal up-positions ready for a repetition of the operation previously described. A light coil spring —80'— connects the arm —66— to the link —67— to hold the latter in operative engagement with the pin —68— on the cam ring —69— as the angular relation between the arm and link changes when operating the cam.

*Moistening device.*—The reservoirs —4— and —5— are adapted to contain a suitable quantity of water and are removably mounted in recesses in their respective brackets —2— and —3— in planes some distance below and above the table —30—. Within these reservoirs are journaled relatively large grooved wheels —82— and —83— having their lower edges immersed in the water for receiving and guiding portions of their corresponding belts —11— and —12—, the lower reservoir provided with upwardly projecting arms —84— for receiving and supporting grooved idlers— 85— for additionally guiding the belt —11— in its travel around the upper side of the feeding roller —13—, one of the arms, —84—, being pivoted upon the shaft of the grooved wheel —82— to swing forwardly and rearwardly and is spring-pressed in one direction by a coil spring —86— wound around the hub of the arm —84— and having one end attached to the adjacent side of the reservoir —4— and its other end attached to the arm —84— so as to cause the idler —85— to press against one side of the belt —11— to take up any slack therein and, at the same time, permitting the belt to be easily and quickly removed from the guide rollers or wheels when desired, the particular arrangement of the spring and arm being shown in Fig. 10.

Within the reservoir —4— is mounted a pair of grooved squeezing rollers —88— engaging opposite sides of the upwardly traveling portion of the belt just above the water line to express excessive moisture therefrom, one of the rollers being mounted upon a rock arm —89— which is pivoted at —90— to the front side of the case as shown more clearly in Figs. 10 and 13, said arm being spring-pressed by a spring —91— toward the other roller, which spring is interposed between the free end of the arm —89— and an adjusting screw —92—, whereby the tension of the spring may be varied at will to vary the pressure of the rollers upon the adjacent portion of the belt. In like manner, the upper reservoir —5— is provided with arms —93— and —94— carrying grooved idlers —95— at opposite sides of the grooved wheel —83—, the arm —94— being journaled upon a supporting shaft for the wheel —83— and is spring pressed in one direction by a coil spring —96— to take up any slack in the belt.

Within the reservoir —5— is also located a pair of squeezing rollers —97— similar to the rollers —88—, one of the rollers —97— being mounted upon a rock arm 98—which is pivoted at —99— to the front side of the reservoir and is spring pressed toward the opposite roller by a compression spring —100— tensioned by an adjusting screw —101— for varying the pressure of the squeezing rollers upon the belt.

What I claim is:

1. In a collar dampening machine, a collar feeding member movable to and from its feeding position, means normally holding the feeding member in its inoperative position, and additional means actuated by the collar for tripping said holding means and allowing the feeding member to assume its feeding position while the collar is engaged thereby.

2. In a collar dampening machine, a collar feeding member movable to and from its feeding position, means normally holding said member from its feeding position, separate means for forcing said member to its feeding position, and additional means operated by the collar as it is fed by hand toward the feeding member for tripping said holding means.

3. In a collar dampening machine, a collar feeding member movable to and from its feeding position, means for forcing said member to its feeding position, mechanism actuated by the collar for holding the feeding member in its feeding position while engaged with the collar, and additional means for automatically forcing the feeding member from its feeding position when not engaged with the collar.

4. In a collar dampening machine, a collar feeding and moistening device having one of its feeding members movable to and from its feeding position, means for forcing said member to its feeding position, collar actuated means for holding said member in its feeding position while engaged with the collar, and additional means for forcing said member from its feeding position when not engaged with the collar.

5. In a collar dampening machine, a collar feeding means having one of its feeding members movable to and from its feeding position, a trigger in the path of movement of the collar and operated thereby, means for forcing the movable feeding member to its feeding position, and separate mechanism controlled by said trigger for moving said feeding member into engagement with the collar and holding it in its feeding position while engaged with the collar, and for forcing said member from its feeding position when the collar passes out of engagement with said member.

6. In a machine for dampening seamed articles, opposite coacting dampening belts and rotary driving members therefor having adjacent portions traveling in the same direction for feeding the article between them, means normally holding said members apart, means controlled by the presence of an article at a predetermined point relatively to the feeding means for tripping said holding means, and additional means for forcing the feeding means into engagement with said article when the holding means is tripped.

7. In a machine of the character described, a support for the articles to be dampened, coacting rotary members for feeding and dampening said article, means normally separating the feeding and dampening members when no article is present between them, additional means controlled by the presence of an article between the feeding means for tripping the separating means, and further means for forcing the feeding means into engagement with said article when presented to a predetermined position relatively to said feeding means.

8. In a machine for dampening seamed articles, a rotary feeding member movable to and from its feeding position, a guide coacting with the seam to guide the article parallel with the seam, means for normally holding the feeding member from its feeding position, additional means including a trigger engaged by said article when present in the machine for tripping said holding means, and further means for forcing the feeding member to its feeding position simultaneously with the tripping of the holding means.

In witness whereof I have hereunto set my hand this 15th day of May, 1913.

F. C. BARNES.

Witnesses:
E. A. THOMPSON,
EVA E. GREENLEAF.

Copies of this patent may be obtained for five cents each, by addressing the "Commissioner of Patents, Washington, D. C."